(12) United States Patent
Yao et al.

(10) Patent No.: US 6,580,572 B1
(45) Date of Patent: Jun. 17, 2003

(54) COMBINATION GLIDE TEST/BURNISHING HEAD AND HEAD SUSPENSION

(75) Inventors: Wei Hsin Yao, Fremont, CA (US); Ramesh Sundaram, Fremont, CA (US); David Shiao-Min Kuo, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 211 days.

(21) Appl. No.: 09/737,388

(22) Filed: Dec. 14, 2000

Related U.S. Application Data

(60) Provisional application No. 60/170,841, filed on Dec. 14, 1999.

(51) Int. Cl.[7] .............................. G11B 5/02; G01B 7/34
(52) U.S. Cl. ........................... 360/25; 73/105; 324/212
(58) Field of Search .............................. 360/25, 31, 75; 73/105; 324/212; 451/312, 317, 324; G01B 7/34, 21/30, 17/08; G11B 21/21, 5/84

(56) References Cited

U.S. PATENT DOCUMENTS 5,863,237 A * 1/1999 Felts et al. .................... 451/41
6,262,572 B1 * 7/2001 Franco et al. ............... 324/212
6,272,909 B1 * 8/2001 Yao et al. ..................... 73/105

* cited by examiner

*Primary Examiner*—David Hudspeth
*Assistant Examiner*—Dan I. Davidson
(74) *Attorney, Agent, or Firm*—Edward P. Heller, III; Raghunath S. Minisandram (57) ABSTRACT

A combination glide test/burnishing head can be utilized in a glide test/burnishing system. The combination glide test/burnishing head includes two piezo-electric elements, which can be utilized in a passive mode as sensors for detecting contacts between the glide test/burnishing head and asperities on the surface of a magnetic recording disc. Contact between the glide test/burnishing head and disc asperities results in generation of a defect detection signal, which can be utilized by associated test logic to define the location of the detected asperities on the disc surface. The piezo-electric elements of the glide test/burnishing head can also be utilized in an active mode to cause yaw variation in the flight attitude of the glide test/burnishing head, in turn causing a burnishing pad on the glide test/burnishing head to be moved radially into contact with a detected disc asperity. Once an active, burnishing operation has been performed, the piezo-electric elements of the glide test/burnishing head are returned to passive mode, to determine if the burnishing operation was successful in removing the asperity on the disc surface. Combining the glide test and burnishing functions in a common head assembly allows the glide test and burnishing functions to be performed using a single actuator for the glide test/burnishing head, simplifying and reducing the cost of a glide test/burnishing system.

3 Claims, 7 Drawing Sheets

COMBINATION GLIDE TEST/BURNISHING HEAD AND HEAD SUSPENSION

CROSS-REFERENCE TO RELATED APPLICATION

This Application claims the benefit of U.S. Provisional Application Ser. No. 60/170,841, filed Dec. 14, 1999.

BACKGROUND OF THE INVENTION

This invention relates generally to the field of rigid disc drives, and more particularly, but not by way of limitation, to a combination glide test and burnishing head, which can be utilized to facilitate manufacture of rigid magnetic recording media with extremely smooth surface characteristics.

Disc drives of the type known as "Winchester" disc drives or rigid disc drives are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorenz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5 ¼" format. Disc drives of the current generation typically have a data capacity of several gigabytes in a 3 ½" package, which is only one fourth the size of the full height, 5 ¼" format or less. Even smaller standard physical disc drive package formats, such as 2 ½" and 5 ¼", have been established. In order for these smaller envelope standards to gain market acceptance, even greater recording densities must be achieved.

The recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. This technology path was necessitated by the need to continuously reduce the size of the gap in the head used to record and recover data, since such a gap size reduction was needed to reduce the size of the individual bit domain and allow greater recording density.

Since the reduction in gap size also meant that the head had to be closer to the recording medium, the quest for increased data density also lead to a parallel evolution in the technology of the recording medium. The earliest Winchester disc drives included discs coated with "particulate" recording layers. That is, small particles of ferrous oxide were suspended in a nonmagnetic adhesive and applied to the disc substrate. With such discs, the size of the magnetic domain required to record a flux transition was clearly limited by the average size of the oxide particles and how closely these oxide particles were spaced within the adhesive matrix. The smoothness and flatness of the disc surface was also similarly limited. However, since the size of contemporary head gaps allowed data recording and retrieval with a head flying height of twelve microinches (0.000012 inches, $12\mu$") or greater, the surface characteristics of the discs were adequate for the times.

Disc drives of the current generation incorporate heads that fly at nominal heights of only about $1.0\mu$", and products currently under development will reduce this flying height to $0.5\mu$" or less. Obviously, with nominal flying heights in this range, the surface characteristics of the disc medium must be much more closely controlled than was the case only a short time ago.

In current disc drive manufacturing environments, it is common to subject each disc to component level testing before it is assembled into a disc drive. One type of disc test is referred to as a "glide" test, which is used as a go/no-go test for surface defects or asperities, or excessive surface roughness. A glide test typically employs a precision spin stand and a specially configured glide test head including a piezo-electric sensing element, usually comprised of lead-zirconium-titanate ($PbZrTi_3$), also commonly known as a "pzt glide test head". The glide test is performed with the pzt glide test head flown at approximately half the flying height at which the operational read/write head will fly in the finished disc drive product. For instance, if the disc being glide tested is intended for inclusion in a disc drive in which the operational heads will fly at $1.0\mu$", the glide test will typically be performed with the pzt glide test head flying at $0.5\mu$". If the glide test is completed without sensing any surface defects, then the disc is passed on the assumption that there will be no adverse effects on the operational heads and the discs during normal operation with a nominal head flying height twice that of the pzt glide test head flying height.

If, however, surface asperities or defects exist on the surface of the disc under test, the passage of the glide test head over the surface asperity will result in excitation of the glide test head, due to either direct contact between the pzt glide test head and the surface defect, or the disruption of the nominal hydrodynamic relationship between the rotating disc and the pzt test head. Current glide test head technology allows for the detection of media surface defects in the sub-microinch range.

When surface defects are detected on a disc, the disc is subjected to an additional manufacturing step called "burnishing". Burnishing is accomplished through the use of specially configured burnishing heads. The burnishing head is engaged with a rotating disc and contact between the burnishing head and surface defects results in mechanical removal of the surface defects. Following the burnishing process, the glide test is again performed. Current economic considerations dictate that any given disc will be subjected to the burnishing and glide test processes only a limited number of times, such as twice, before—in the continuing presence of surface defects—being finally rejected.

Currently utilized glide test systems include a glide test head actuator which steps the glide test head across the data recording region of the disc being tested in small enough increments to ensure that the entire data recording surface passes beneath the glide test head. Should a surface asperity be detected during the glide test, the disc is burnished using a separate burnishing head. In order to minimize handling of the discs, it is common practice to provide a separate burnishing head actuator on the test system to move the burnishing head across the disc.

Once the burnishing head has been moved across the entire disc surface, the burnishing head is disengaged from the disc and the glide test is re-engaged with the disc and the glide test is re-performed. If the glide test is successful, the disc is passed to the drive manufacturing process. Should the glide test again detect a surface defect on the disc, the burnishing process is repeated.

Once again, it should be noted that the glide test/burnish processes are typically repeated only a limited number of times before the disc is scrapped as defective.

One of skill in the art will readily appreciate that prior art glide test/burnish systems which require separate actuators for glide test and burnishing heads include substantially duplicate mechanical and electronic components for the separate glide test and burnishing operations. A glide test/burnish system which utilizes a single common combination glide test/burnishing head assembly—and thus a single mechanical actuator system—for both the glide test and burnishing functions would result in significant reduction in capital equipment costs.

It is toward such a combination glide test/burnishing head and a system which utilizes such a combination glide test/burnishing head that the present invention is directed.

SUMMARY OF THE INVENTION

The present invention is a combination glide test/burnishing head which can be utilized in a glide test/burnishing system. The combination glide test/burnishing head includes two piezo-electric elements, which can be utilized in a passive mode as sensors for detecting contacts between the glide test/burnishing head and asperities on the surface of a magnetic recording disc. Contact between the glide test/burnishing head and disc asperities results in generation of a defect detection signal, which can be utilized by associated test logic to define the location of the detected asperities on the disc surface. The piezo-electric elements of the glide test/burnishing head can also be utilized in an active mode to cause yaw variation in the flight attitude of the glide test/burnishing head, in turn causing a burnishing pad on the glide test/burnishing head to be moved radially into contact with a detected disc asperity. Once an active, burnishing operation has been performed, the piezo-electric elements of the glide test/burnishing head are returned to passive mode, to determine if the burnishing operation was successful in removing the asperity on the disc surface. Combining the glide test and burnishing functions in a common head assembly allows the glide test and burnishing functions to be performed using a single actuator for the glide test/burnishing head, simplifying and reducing the cost of a glide test/burnishing system.

DETAILED DESCRIPTION OF THE INVENTION

Figure 1:
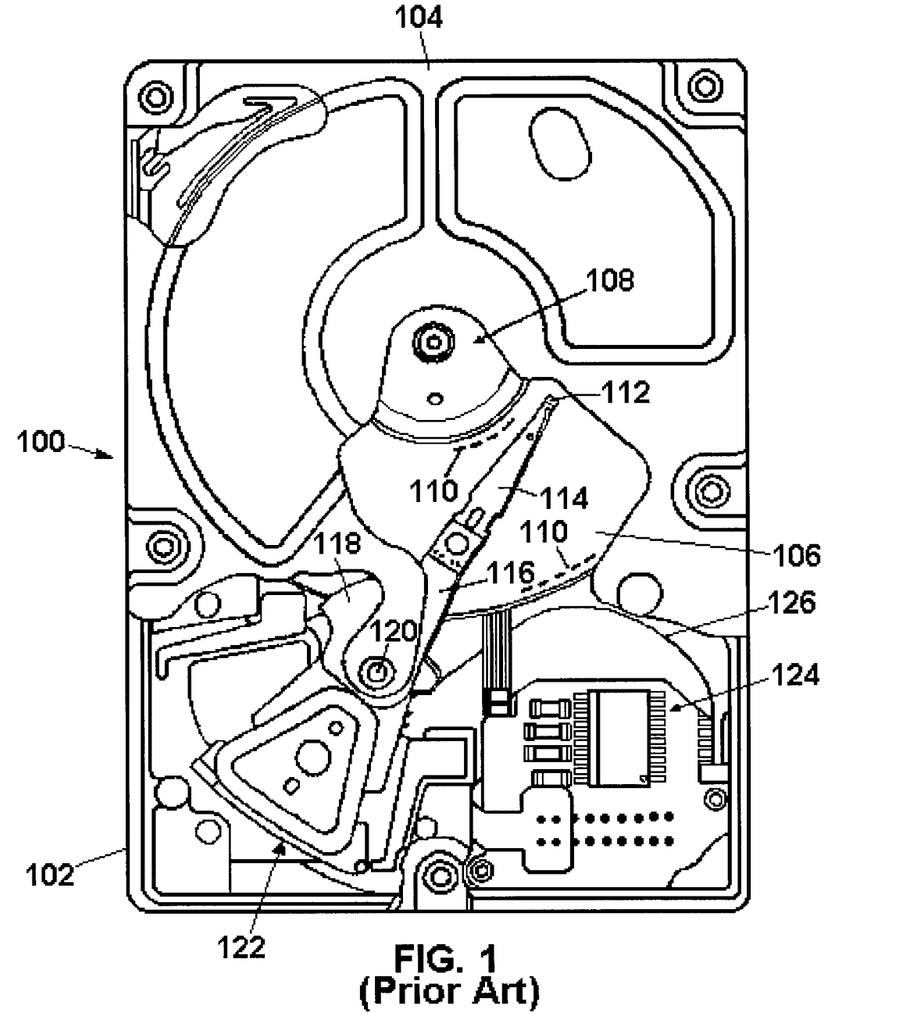
FIG. 1 is a top plan view of a disc drive, partially in cutaway, which utilizes discs which can be glide tested and burnished utilizing the combination glide test/burnishing head of the present invention.

Turning now to the drawings and specifically to FIG. 1, shown is a plan view of a disc drive 100 which includes discs which can be tested and/or processed using the present invention. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of precision ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

It will be apparent to one of skill in the art that the proper operation of the disc drive 100 will depend in large part to the existence of a controlled, precise relationship between the head assemblies 112 and the discs 106. Therefore, it is common in the bindustry to test each of the discs 106 included in the disc drive 100 before the discs 106 are assembled into a disc drive 100.

Figure 2:
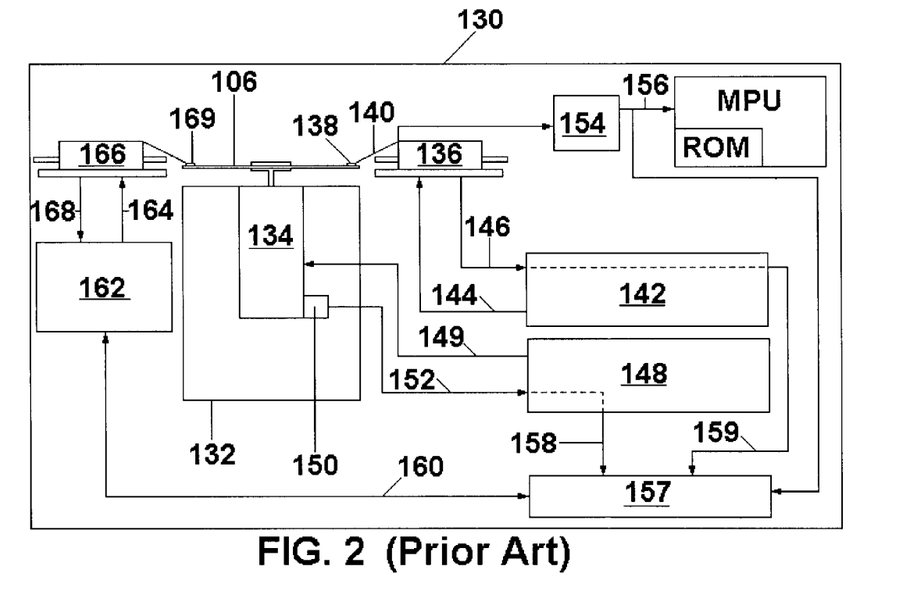
FIG. 2 is a simplified block diagram of a prior art glide test/burnishing system.

FIG. 2 is a simplified functional block diagram of a typical prior art glide test/burnishing unit 130 used to glide test and map the surface of recording discs as components before the discs are assembled into disc drive units, as well as components for burnishing detected defects on the tested discs. The glide test/burnishing unit 130 is controlled by a microprocessor unit (MPU in the figure) which operates under control of a program stored in read only memory (ROM in the figure).

The glide test/burnishing unit 130 includes a precision spin stand 132 which further includes a spin motor 134 on which the disc 106 is mounted for rotation and testing/burnishing.

The glide test/burnishing unit 130 also typically includes a glide test linear actuator 136 which is used to controllably move a glide test head 138, mounted on a head suspension 140, on a linear path across a radius of the disc 106. Glide test actuator control logic 142 is also included in the glide test/burnishing unit 130 and provides the control signals on signal path 144 needed to move the glide test head 138 and monitors, via signal path 146, the position of the glide test head 138 during glide testing of the disc 106. In a typical glide test/burnishing unit of the current art, the glide test actuator supports and controls a second glide test head for simultaneous glide testing oft he second disc surface. For purposes of clarity, the figure shows only a single glide test head 138.

The glide test/burnishing unit 130 also includes spin motor control logic 148 which is used to accelerate the spin motor 134 to its intended testing speed by passing motor drive signals on path 149. It is common practice in the industry to vary the speed of the spin motor 134 as the glide test head 138 is moved across the disc radius to provide a constant linear velocity between the glide test head 138 and the area of the disc being tested. That is, as the glide test head 138, is moved inward, the speed of the spin motor is increased proportionally to maintain a constant linear velocity, and thus maintain a constant flying height for the glide test head 138.

The spin stand 132 also includes a spin motor position encoder 150 which provides a position dependent reference signal. This reference signal is carried over signal path 152 to the spin motor control logic 148 where it is used to assist in the control of the speed of the spin motor 134. The reference signal is also passed via signal path 158 to defect mapping logic 157, where it is utilized, along with the glide test actuator position signal passed via signal path 159 by the glide test actuator control logic 142, to maintain a constant calculation of the radial and circumferential portion of the disc 106 that is located under the glide test head 138.

During the glide testing operation, a disc 106 is mounted on the spin motor 134 and the spin motor 134 is brought up to operational speed by the spin motor control logic 148. Once the spin motor 134 is at the proper speed, the glide test actuator control logic 142 causes the glide test actuator 136 to move the glide test head 138 into cooperative arrangement with the surface of the disc 106. The glide test head 138 is then stepped across the spinning disc 106 at a rate selected to cause the glide test head 138 to pass over every portion of the disc surface. As the glide head is stepped across the disc surface, the spin motor control logic 148 varies the spin motor speed to maintain a constant relative linear velocity between the glide test head 138 and the disc area being tested as noted above.

If the glide test is completed without contact between the glide test head 138 and any defects on the surface, the disc tested is considered in proper condition for inclusion in a finished disc drive, and is passed to the disc drive manufacturing line.

A defect on the disc surface will cause the glide test head 138 to generate a glide defect signal which is passed to the defect mapping logic 157 via signal path 156. Defect sensing circuitry 154 responds to the presence of a glide test defect, and passes a defect detection signal back to the MPU also via signal path 156, which results in the current radial and circumferential location of the test head 138 relative to the disc 106 being recorded. Once the glide test head 138 has passed over the entire usable radial extent of the disc 106, all detected and recorded defects are correlated to produce a defect map of the entire disc surface.

Since the discs themselves are one of the more costly components in disc drives, it is common practice in the industry to attempt to rework discs found to have glide defects by performing a burnishing process on them. The burnishing process utilizes a specially configured burnishing head, which flies below the glide test height and includes features designed to mechanically remove certain glide defects. After the burnishing process is completed, the disc is once again glide tested. If the disc now passes the glide test, it is passed to the drive manufacturing line. If the glide test following the burnishing process still indicates the presence of glide defects on the disc, the burnishing and re-glide testing operations can be repeated. Economic considerations typically limit the number of iterations of burnish/re-glide test that are performed before the disc is scrapped as unusable.

Returning to FIG. 2, when a glide test defect is detected and mapped by the defect mapping logic 157, information related to the location of the detected defect is passed from the defect mapping logic on bidirectional signal path 160 to burnishing actuator control logic 162. The burnishing actuator control logic 162 uses signal path 164 to pass control signals to drive a burnishing head actuator 166. Information regarding the position of the burnishing head actuator 166 is passed back to the burnishing actuator control logic 162 via signal path 168 in a "closed loop" manner.

The burnishing head actuator 166 is used to controllably move a specially configured burnishing head 169 across the surface of the disc 106 to perform the burnishing process. This burnishing process can be selective, moving the burnishing head 169 only to the location of a detected glide test defect as provided to the burnishing actuator control logic 162 by the defect mapping logic 157, or can simply move the burnishing head 169 across the entire data recording area of the disc. The configuration and flying height and attitude of the burnishing head 169 are selected to mechanically remove surface defects which protrude above the surface of the disc 106 by more than a particular height, and this height is, in turn, selected to be less than the intended flying height of a read/write head engaged with the disc 106 once it is assembled in a disc drive, such as the disc drive 100 of FIG. 1.

Once the burnishing process is completed, the burnishing actuator control logic notifies the MPU (signal path not shown), which reinitiates the glide test operation as described above. The sequence of glide test/burnishing is repeated until the program being run by the MPU determines either that the disc is suitable for use in a disc drive or that further iterations are likely to be futile in qualifying the disc, and designates it for scrap.

It should also be noted that the defect map generated above can also be used for further examination of failed discs, such as microscopic analysis of mapped defects, should such an analysis be desired, as, for instance, an aid in improving the manufacturing process for the discs.

Test units of the type described above and which can be modified to include and implement the present invention are available from several sources. A typical test unit of this type is the model number MSA 450, manufactured by Cambrian Systems, Inc., a subsidiary of Phase Metrics Corporation, located in Westlake Village, Calif.

Figure 3:
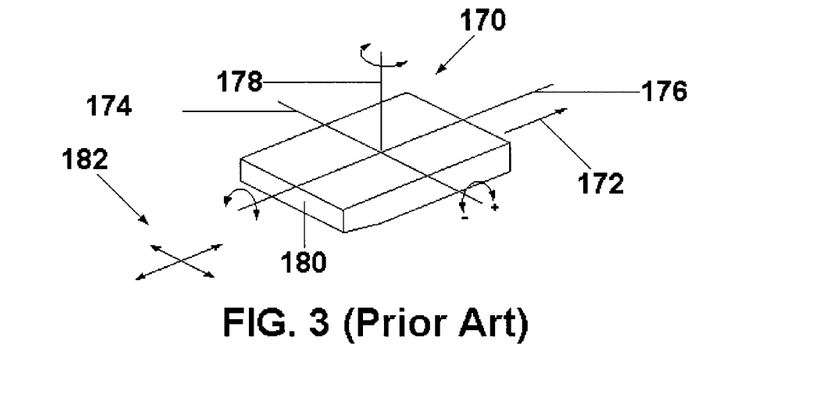
FIG. 3 is a simplified perspective view of a slider body for a head assembly identifying the orthogonal axes associated with the head assembly, and which are referenced throughout the ensuing discussion.

Before proceeding with a detailed discussion of the field and background of the invention, identification of orthogonal references utilized in the ensuing discussion is in order. Turning now to FIG. 3, shown is a simplified perspective view of a typical head assembly 170, with the direction of disc rotation relative to the head assembly 170 being shown by arrow 172.

The head assembly 170 has a longitudinal axis, i.e., the axis extending along its major dimension and substantially parallel to the direction of disc rotation 172, and a lateral axis, i.e., the axis extending along its semi-major axis and perpendicular to the direction of disc rotation 172.

Standard usage in the industry defines pitch axis 174 as being parallel to the lateral axis, the roll axis 176 as being parallel to the longitudinal axis, and the yaw axis 178 as being perpendicular to both the pitch and roll axes, as shown in FIG. 3.

Attitude variations about the pitch axis 174 determine the relative flying heights of the leading edge 180 and trailing edge (not designated in the figure, opposite the leading edge 180) of the head assembly 170. It is also commonly known in the industry to locate the load point of the head suspension that supports the head assembly 170 such that the head assembly 170 flies with a slightly "nose up" pitch attitude which encourages the establishment of the air bearing between the head assembly 170 and an associated rotating disc. This "nose up" attitude is also referred to as a slightly positive pitch attitude, as indicated by the "+" sign on the arrow associated with the pitch axis 174.

Roll axis variations affect the relative flying height of the inner and outer lateral edges of the head assembly 170. It will be noted that there is no reference in FIG. 3 to identify the inner or outer sides of the head assembly 170. Therefore, no "+/−" designation is shown on the rotational arrow associated with the roll axis 176. Likewise, the rotational arrow associated with the yaw axis 178 is also not designated to indicate the direction of positive and negative yaw variations.

Finally, translational motion of the head assembly relative to an associated disc, and sometimes referred to as motion along "in-plane axes", is indicated in FIG. 3 by arrows at 182.

As is known to those of skill in the art, and as will be discussed further in the ensuing discussion, the head suspensions used to mount and support head assemblies in cooperative engagement with associated discs commonly provide compliance in the pitch and roll axes 174, 176, while maintaining stiffness in the yaw and in-plane axes 178, 182.

Figure 4:
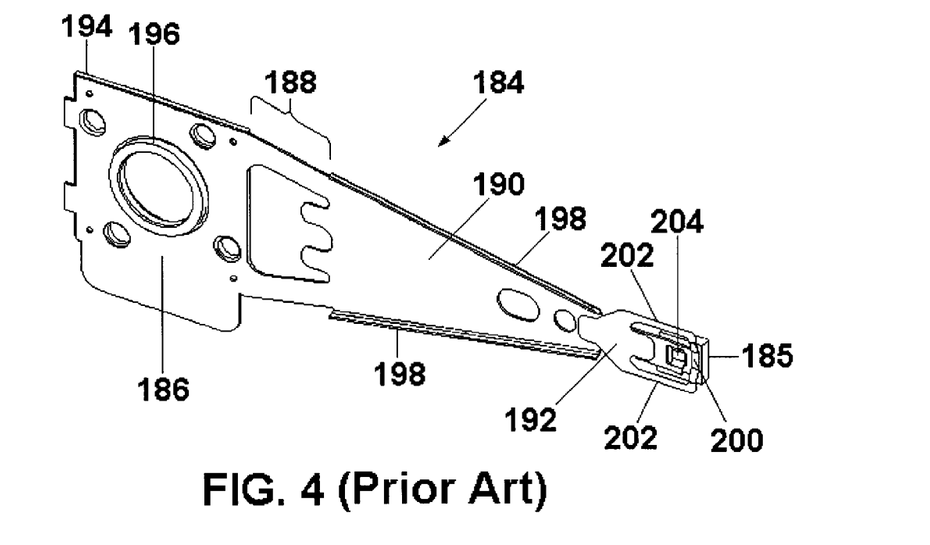
FIG. 4 is a perspective view of a typical prior art head/head suspension assembly, identifying major components of the assembly.

Turning now to FIG. 4, shown is a perspective view of a typical prior art head suspension 184 used to mount and support a head assembly 185. The figure is useful for identification of major functional elements common to most types of head suspensions.

A typical head suspension includes a mounting portion 186, used to mount the head suspension and associated head assembly. 185 to an actuator, a spring portion 188, which provides a spring force which acts to counterbalance the hydrodynamic lifting force generated by the air bearing between the head assembly 185 and the associated disc, a rigid beam portion 190 which transfers the spring force generated by the spring portion 188, and a gimbal portion 192 which physically mounts the head assembly 185 and provides compliance in the pitch and roll axes of the head assembly 185, while maintaining stiffness in the yaw and in-plane axes of the head assembly 185.

Since the above identified elements of the head suspension are typically fabricated from thin stainless steel foil, it is common practice in the industry to provide a relatively robust mounting plate 194 in association with the mounting portion 186. The mounting plate 194 further includes a swage boss 196 or other similar feature which facilitates the connection of the entire head suspension 184 to an actuator (not shown).

In order to provide additional stiffness to the rigid beam portion 190, it is common that the lateral extremes of the rigid beam portion 190 be formed into channels 198, which are also used as a path for signal wires (not shown in the figure, for clarity) which carry data to and from the head assembly 185.

The gimbal portion 192 includes a connecting element 200 which is typically adhesively attached to the head assembly 185. The pitch and roll compliance necessary to allow the head assembly 185 to follow minor surface variations in associated discs is provided by a pair of laterally displaced gimbal beams 202 which bend relatively freely in the vertical direction, while being stiff in the plane parallel to the disc surface. Finally, the gimbal portion 192 includes a load point 204—which is physically located on an extension of the rigid beam portion 190—which provides a point transfer location for application of the spring force generated by the spring portion 188 and transferred by the rigid beam portion 190 to the load point 204.

Figure 5:
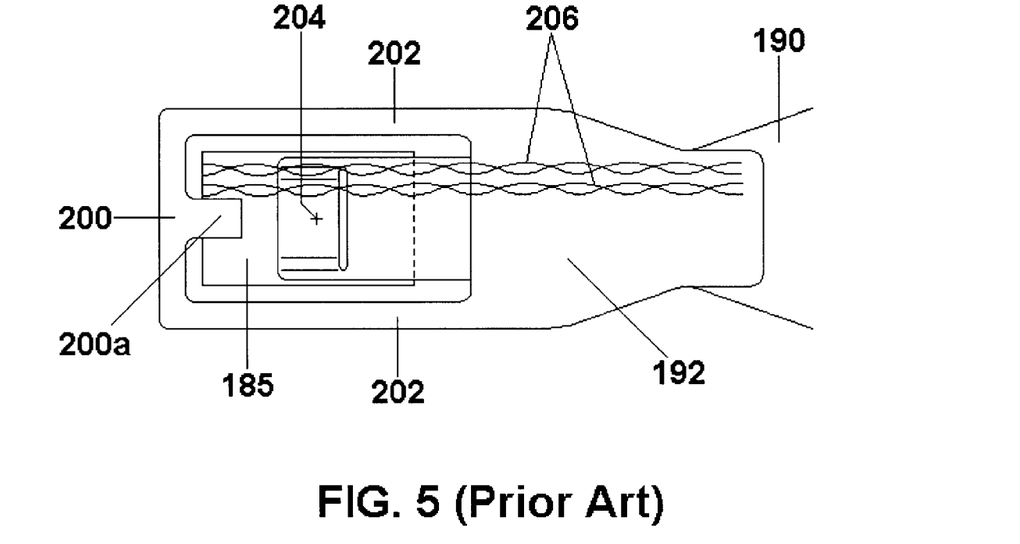
FIG. 5 is an extreme close-up top view of a prior art head assembly and portions of a gimbal assembly showing component relationships.

FIG. 5 is a detail top plan view of the gimbal portion of another prior art head suspension, with elements similar to those identified in FIG. 4 numbered with like numerical references. A comparison of FIGS. 4 and 5 reveals certain small differences.

For instance, in FIG. 4, the connecting element 200 is a simple formed beam which is adhesively bonded directly to the head assembly 185, while in FIG. 5, the connecting element 200 still extends between the distal ends of the gimbal beams 202, but the head assembly 185 is bonded to a tongue element 200a, which extends longitudinally from the connecting element 200. Such a configuration allows the load point 204 to lie substantially between the longitudinal midpoints of the gimbal beams 202, a provision which is desirable for reasons known to those of skill in the art.

FIG. 5 also includes signal wires 206 which were omitted from FIG. 4 for clarity. There are two pairs of signal wires 206 shown in FIG. 5, as would be found on current state-of-the-art magneto-resistive (MR) read/write heads, with one pair of signal wires 206 connected to an inductive write element (not shown in the figure) and the other pair of signal wires 206 connected to a MR read element (also not shown). During write operations, write signals are placed on the pair of signal wires 206 to magnetically induce the desired write data pattern on the surface of the associated disc. During subsequent read operations, magnetic flux variations on the disc will induce proportional resistance changes in the MR read element, which are reflected in the pair of signal wires 206 associated with the MR read element.

As is known to those of skill in the art, the illustrated configuration of gimbal portion elements provides relatively high compliance in the pitch and roll axes of the head assembly 185, while remaining relatively stiff in the yaw and in-plane axes, as previously defined in FIG. 3.

Figure 6:
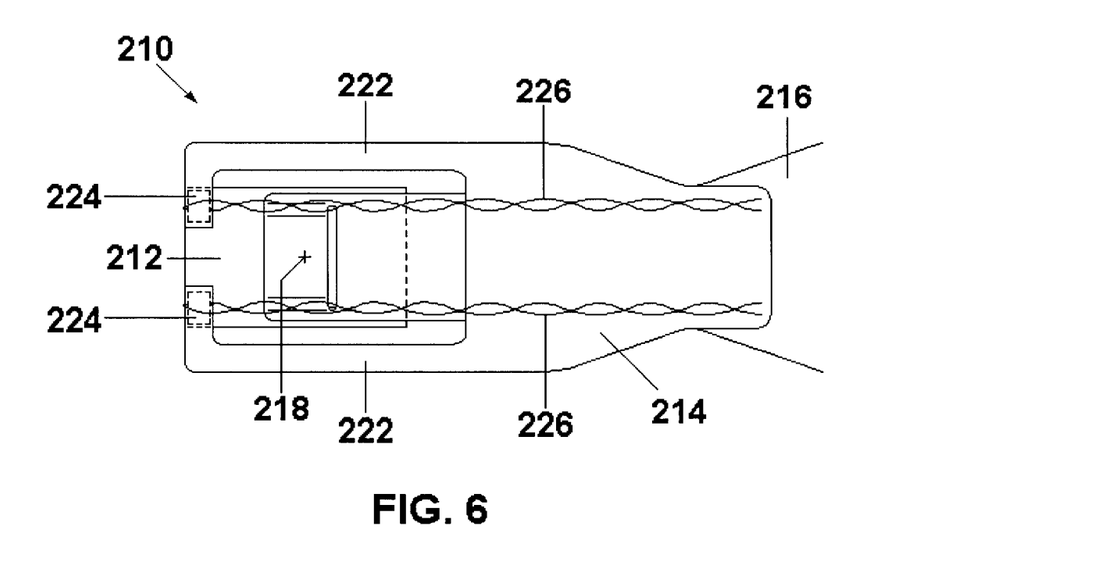
FIG. 6 is an extreme close-up top view of the combination glide test/burnishing head of the present invention.
Figure 7:
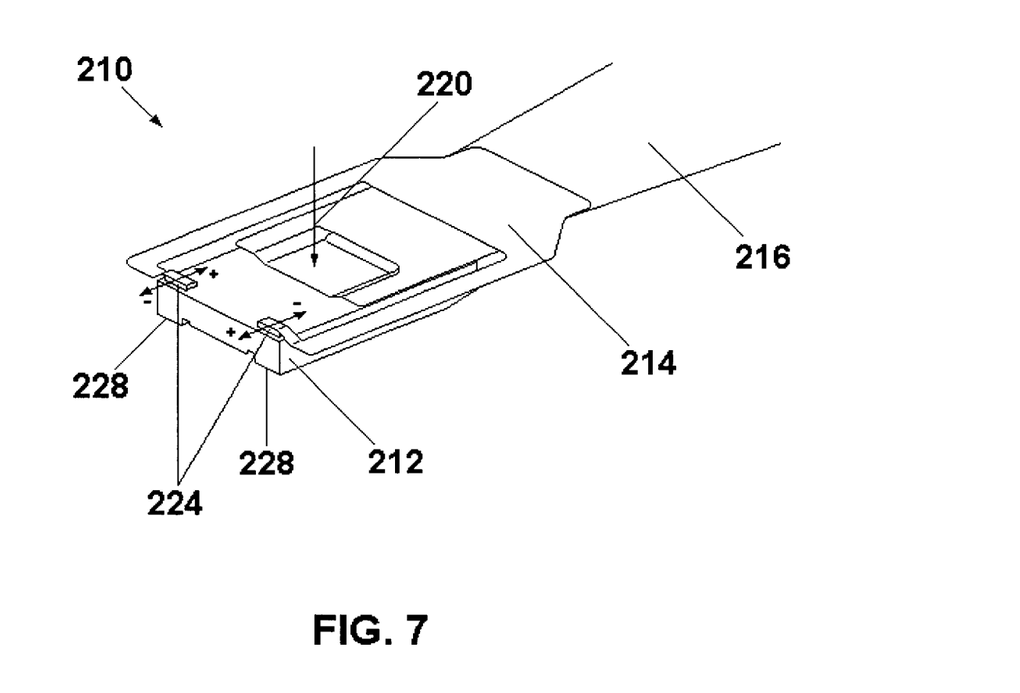
FIG. 7 is a perspective view of the glide test/burnishing head of FIG. 6.

Turning now to FIGS. 6 and 7, shown are top plan and perspective views, respectively, of a glide test/burnishing head and head suspension assembly 210 made in accordance with the present invention. Specifically shown is the distal end of such an assembly, including a glide test/burnishing head assembly 212, a specially configured gimbal portion 214 and part of an associated rigid beam portion 216. The rigid beam portion 216, as in the prior art examples of FIGS. 4 and 5, includes a load point 218 which provides a localized site for application of the load force generated by the spring portion (not shown) of the head suspension assembly, as illustrated by arrow 220 in FIG. 7. The gimbal portion 214 also includes a pair of laterally displaced gimbal beams 222, which act similarly to those in the prior art examples to provide the desired compliance in the pitch and roll axes of the glide test/burnishing head assembly 212.

An initial difference between the gimbal portion 214 of the present invention and the example prior art gimbal portions is the fact that the distal ends of the gimbal beams 222 are not directly connected as in the prior art. Instead, the distal ends of the gimbal beams 222 extend inward and connect with a pair of piezoelectric sensors/microactuators (PS/MAs) 224, which are, in turn, bonded to the upper surface of the glide test/burnishing head assembly 212. Each of the PS/MAs includes an associated pair of signal wires 226, shown in FIG. 6 and omitted from FIG. 7 for clarity.

As will be explained in full detail below, the PSMAs 224 can operate in either a passive, or sensor, mode, or in an active, or burnishing, mode.

During passive mode operations, the glide test/burnishing head 212 is used in a similar manner to prior art glide test heads. That is, as explained above with regard to FIG. 2, a disc to be glide tested is mounted on an appropriate spin stand and brought up to testing speed. The glide test/burnishing head 212 is then stepped across the entire data recording area of the disc at a flying height which is lower than the flying height at which an operational read/write head is intended to fly above the disc in a disc drive.

Any surface defect which contacts the air bearing surfaces (ABS) 228 of the glide test/burnishing head assembly 212 causes the body of the glide test/burnishing head assembly 212 to vibrate, in turn causing the PS/MAs 224 to output an electrical signal on signal wires 226. Such contacts are noted in the associated electronic circuitry, and the radial and circumferential location of the defect is noted.

It will be recalled that, with the prior art glide test/burnishing system of FIG. 2, detection of such detected defects results in an attempt to burnish the defect location using a separate burnishing head and burnishing head actuator (169 and 166, respectively, in FIG. 2). However, the glide test/burnishing head assembly 212 of the present invention includes additional features which eliminate the need for a separate burnishing head and burnishing head actuator.

Figure 8:
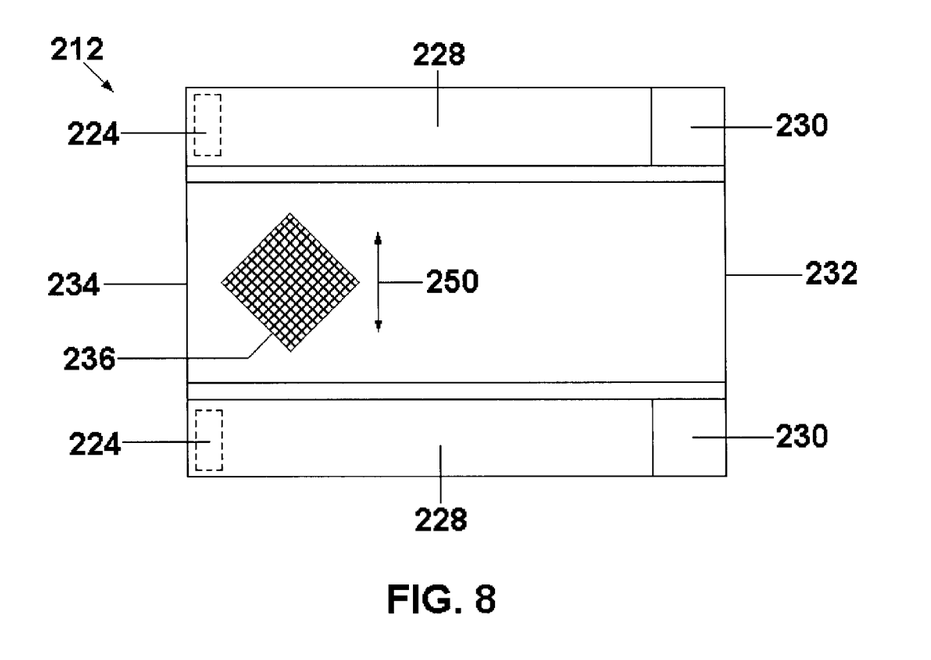
FIG. 8 is a bottom view of the glide test/burnishing head of FIGS. 6 and 7.
Figure 9:
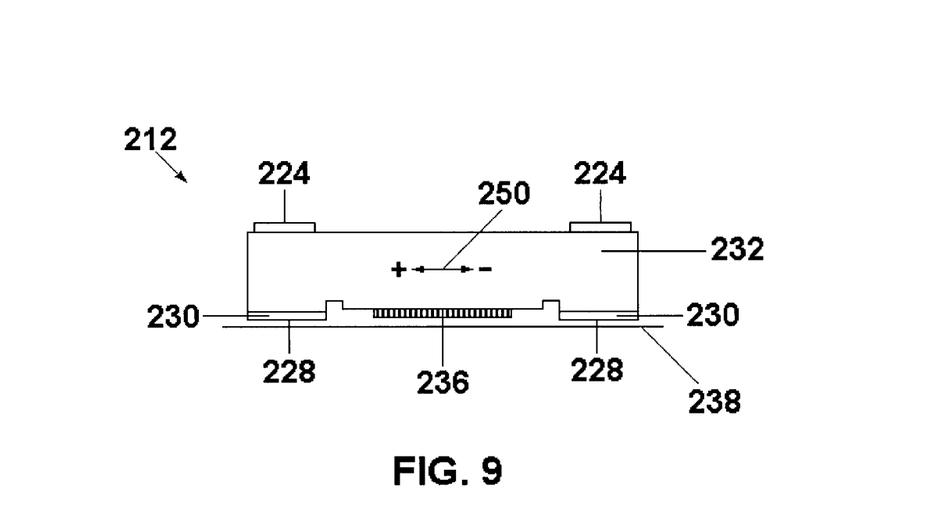
FIG. 9 is an end elevation view of the glide test/burnishing head of FIGS. 6 through 8.

Turning now to FIGS. 8 and 9, shown are bottom plan and front elevation views, respectively, of the glide test/burnishing head assembly 212 of the present invention. The figures show that the glide test/burnishing head assembly 212 includes a pair of laterally disposed air bearing surfaces (ABS) 228, with beveled portions 230 near the leading edge 232 of the glide test/burnishing head assembly 212 to aid in rapidly establishing the air bearing between the glide test/burnishing head 212 and a disc being tested.

It should be noted that the "catamaran" type of ABS configuration shown in the figure is a common type of configuration for head assemblies. However, the scope of the present invention is not envisioned to be limited to the particular configuration of ABSs provided on the, head assembly, and it will be readily apparent to those of skill in the art that the present invention can also be implemented on head assemblies which include negative pressure air bearing surfaces (NPABS), or other well known ABS configurations.

The location of the piezoelectric sensors/microactuators (PS/MAs) 224 on the upper surface of the glide test/burnishing head assembly 212 is shown by dashed lines near the trailing edge 234 of the glide test/burnishing head assembly 212 in FIG. 8 and on the upper surface of the glide test/burnishing head assembly 212 in FIG. 9.

Also shown in FIGS. 8 and 9 is a burnishing pad 236, located between the ABSs 228 near the trailing edge 234 of the glide test/burnishing head assembly 212. As can be seen most clearly in FIG. 9, it is envisioned that the lowermost surface of the burnishing pad 236 is slightly further removed from the surface of an associated disc, as illustrated by line 238, than are the ABSs 228. Thus, during passive glide testing operations, any defects on the surface of the associated disc are likely to contact the ABSs 228, rather than the burnishing pad 236, and the glide test/burnishing head assembly 212 therefore acts similarly to a prior art glide test head. It is only after detection of a surface defect that the particular advantages of the present invention come into operation.

The burnishing pad 236 illustrated in FIGS. 8 and 9 is in the form of a square pad with its sides rotated substantially 45° from the, longitudinal and lateral axes of the glide test/burnishing head assembly 212. The surface of the burnishing pad 236 is formed with a waffle-like texture through the processes of either machining, photo-etching, ion milling or other processes known in the art. It should be noted here that the scope of the present invention is not envisioned to be limited by the shape of the burnishing pad, the type of surface texture applied to the burnishing pad 236, or methods used to shape or texture the burnishing pad 236. Thus, for example, the burnishing pad could be circular, elliptical, diamond-shaped, or tear-drop shaped, and the surface texture on the burnishing pad 236 could be achieved by any appropriate method.

Returning now to FIGS. 6 and 7, once a defect has been detected during passive operation of the glide test/burnishing head and head suspension assembly 210 of the present invention, associated electronic circuitry (to be described in more detail below) switches the PS/MAs 224 from passive to active mode. In active mode, drive signals are passed on the signal wires 226 to the PS/MAs 224, which cause the PS/MAs 224 to operate as microactuators. Selection of the polarity of the drive signals allows determination of the direction of microactuator motion, and, as will be discussed in more detail below, the effect of such microactuator motion on the overall operation of the invention.

It is presently envisioned that the drive signals applied to the PS/MAs 224 will result in the PS/MAs 224 operating in a "push/pull" manner, as illustrated by the "+" and "−" signs at the ends of the arrows associated with the PS/MAs 224 in FIG. 7. That is, when drive signals on the signal wires 226 are selected as "positive" drive signals, the PS/MA on the left of FIG. 7 acts to "pull" the associated side of the glide test/burnishing head assembly 212 toward the rigid beam portion 216 of the head suspension, while the PS/MA to the right in FIG. 7 acts to "push" its side of the glide test/burnishing head assembly 212 in the opposite direction. Reversal of the polarity of the drive signals will serve to reverse the direction of forces applied to the glide test/burnishing head assembly 212. The effect of the application of these forces on the glide test/burnishing head assembly 212 can best be seen in FIG. 10, which is a simplified top view of the glide test/burnishing head assembly 212.

Figure 10:
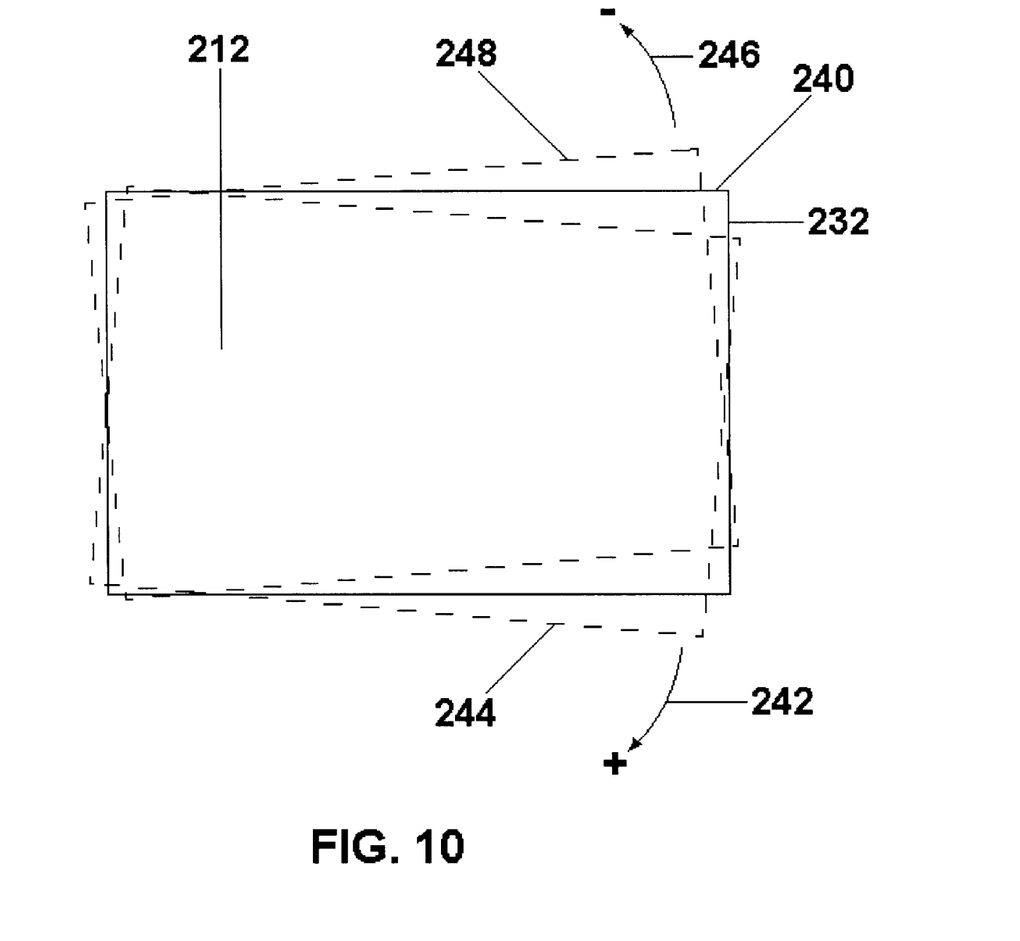
FIG. 10 is a simplified diagrammatic view of the effect of active control of the glide test/burnishing head of the present invention.

FIG. 10 shows the quiescent position of the glide test/burnishing head assembly 212 by solid line 240. Keeping in mind the "+" and "−" designations assigned in FIG. 7, when positive drive signals are applied to the PS/MAs of the glide test/burnishing head 212, the resultant "push/pull" forces cause the leading edge 232 of the glide test/burnishing head assembly 212 to move in the direction of arrow 242, or clockwise in the figure, to the position shown by dashed line 244. Conversely, when negative drive signals are applied, the leading edge 232 of the glide test/burnishing head assembly 212 moves in the direction of arrow 246, or counterclockwise in the figure, to the position shown by dashed line 248. Thus, application of controlled polarity drive signals to the PS/MAs can cause the glide test/burnishing head 212 to rotate about an axis substantially parallel with the yaw axis identified in FIG. 3. The utility of such rotation can best be understood by returning to FIGS. 8 and 9.

Examination of FIGS. 8 and 9 reveals that, as the glide test/burnishing head assembly 212 is controllably rotated clockwise and/or counterclockwise, as shown in FIG. 10, the burnishing pad 236 will be moved laterally, or in the direction of arrows 250.

It is envisioned that the burnishing function of the combination glide test/burnishing head assembly 212 will be implemented by utilizing the actuator which mounts the head to move the burnishing pad 236 to the approximate location of the detected defect, lowering the linear velocity of the disc to bring the burnishing pad 236 into increased proximity to the disc, and using the PS/MAs in their active mode to move the burnishing pad 236 laterally back and forth, substantially in the direction of arrows 250, to attempt to burnish the detected defect to below a height which will cause a glide test defect to be subsequently detected. This burnishing process will be discussed in more detail below.

Figure 11:
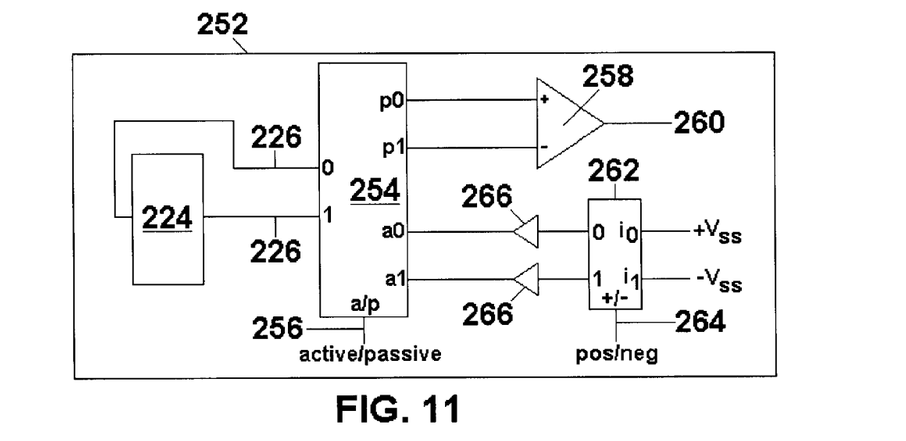
FIG. 11 is a simple block diagram of a control circuit used to select passive sensing or active burnishing modes of the glide test/burnishing head.

FIG. 11 is a simplified block diagram of control logic 252 used to switch between passive and active modes of the piezoelectric sensors/microactuators (PS/MAs) 224, and to control the direction of microactuator motion in the active mode. The control logic 252 includes an active/passive multiplexor 254 which is, in turn, controlled by an active/passive control signal 256 from the microprocessor which controls overall operation of a test system in which the inventive glide test/burnishing head assembly 212 is included. While the block diagram of FIG. 11 shows a single PS/MA 224, one of skill in the art will appreciate that the logic shown can be used to drive both of the pair of PS/MAs 224.

During passive mode operation, the PS/MA 224 acts as a passive piezoelectric sensor, which responds to contact between the glide test/burnishing head assembly 212 and a surface defect on a disc being tested by outputting an electrical signal on signal wires 226. These electrical signals are passed by the active/passive multiplexor 254 from the "0" and "1" terminals to the "p0" and "p1" terminals, respectively, from which they provide the inputs to a differential amplifier 258. The output of the differential amplifier 258 is a defect detection signal 260, similar to defect detection signal on signal path 156 in the prior art of FIG. 2.

During active mode operation, as determined by the active/passive control signal 256, the active/passive multiplexor 254 passes signals on the "a0" and "a1" terminals to the "0" and "1" terminals. The "a0" and "a1" terminals of the active/passive multiplexor 254 are fed from a direction control multiplexor 262.

The direction control multiplexor 262 is used to determine the polarity of the signals applied to the PS/MAs 224, and thus determine the direction of motion imparted to the glide test/burnishing head 212. The inputs, "$i_0$" and "$i_1$", of the direction control multiplexor 262 are tied to a pair of voltage sources, $+V_{ss}$ and $-V_{ss}$. The direction control multiplexor is switched by a direction control signal 264 which, again, is controlled by the microprocessor in the test/burnishing system. Binary switching of the direction control signal 264 gates the + and $-V_{SS}$ voltages either straight through to the "0" and "1" outputs, respectively, or reverses them, such that the $+V_{ss}$ signal passes to the "1" output, while the $-V_{ss}$ signal passes to the "0" output The outputs of the direction control multiplexor are passed through drivers 266, which feed the "a0" and "a1" inputs to the active/passive multiplexor 254.

Thus, the control logic 252 can be used to first determine if the combination glide test/burnishing head 212 of the present invention is to be used in its passive, or sensor mode and pass defect detection signals on to other associated logic— or in its active mode and pass polarity-selected drive signals to the microactuators on the glide test/burnishing head 212.

Figure 12:
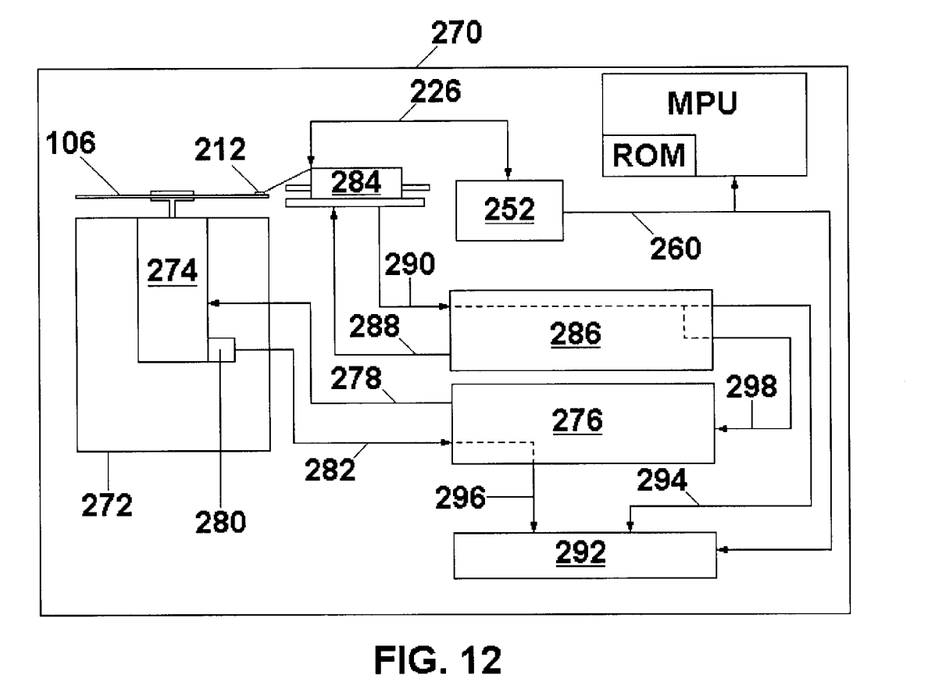
FIG. 12 is a simple block diagram of a glide test/burnishing system incorporating the glide test/burnishing head of FIGS. 6 through 9.

The manner in which the glide test/burnishing head 212 is utilized in a test system is perhaps best seen in FIG. 12, which is a simplified block diagram of such a test system 270.

The test system 270 is operated under the master control of a microprocessor unit (MPU) which runs a program held in read only memory (ROM). The test system 270 also includes a spin stand 272 which further includes a precision spin motor 274, on which a disc 106 to be tested is mounted. Drive signals to operate the spin motor 274 are generated in spin motor control logic 276, and passed to the spin motor 274 via signal path 278. The spin motor 274 also includes a rotational position sensor 280 which passes a signal reflecting the rotational position of the spin motor 274 back to the spin motor control logic 276 via signal path 282. This rotational position information is used by the spin motor control logic 276, along with precision timing signals (not shown), to control the rotational speed of the spin motor 274 in a common "closed loop" manner.

Also included in the test system 270 is a glide test/burnishing actuator 284 which is controlled by actuator control logic 286. The actuator control logic 286 passes drive signals to move the glide test/burnishing actuator 284 via signal path 288, and receives feedback 25 information about the position of the glide test/burnishing actuator 284 on signal path 290. The glide test/burnishing actuator 284 mounts and moves the combination glide test/burnishing head 212 in relationship to the disc 106.

A typical test sequence employing the test system 270 would be as follows:

a) a disc 106 is mounted on the spin motor 274, and the spin motor is brought up to the desired testing speed by the spin motor control logic 276 under control of the MPU;

b) once the disc is at operational speed, the MPU causes the control logic 252 to place the glide test/burnishing head 212 into passive mode, as described above with regard to FIG. 11 and directs the actuator control logic 286 to move the glide test/burnishing 284 actuator such that the glide test/burnishing head 212 is brought into engagement with the disc 106, and stepped across the data recording area of the disc 106;

c) as the glide test/burnishing head 212 is moved across the disc 106, the spin motor control logic 276 monitors the position of the glide test/burnishing actuator, as passed via signal path 298, and varies the speed of the spin motor 274 to maintain a constant linear velocity between the glide test/burnishing head 212 and the disc 106, and thus maintain a constant flying height between the glide test/burnishing head 212 and the disc 106;

d) if the glide test/burnishing head 212 passes over the entire data recording area of the disc 106 without encountering a surface defect, the glide test/burnishing actuator 284 is driven back outward to disengage the glide test/burnishing head 212 from the disc 106, and the disc 106 is dismounted from the spin motor 274 and passed to the disc drive manufacturing line;

e) if, however, the glide test/burnishing head 212 does contact a surface defect on the disc 106, a defect detect signal 260 is generated, causing multiple effects:

1) the defect detection signal 260 is passed to the MPU to notify it that a defect has been detected;

2) the defect detection signal 260 also is passed to the defect mapping logic 292 where it is correlated with the actuator position information on signal path 294 and the spin motor rotational position information on signal path 296 to define the radial and circumferential location of the detected defect;

3) the MPU then switches the control logic 252 for the PS/MAs 224 to the active mode, and directs the actuator control logic to move the glide test/burnishing acutator such that the burnishing pad (236 in FIGS. 8 and 9) is located substantially above the detected defect, and directs the spin motor control logic 276 to reduce the speed of the spin motor 274 to reduce the flying height of the glide test/burnishing head 212 and bring the burnishing pad 236 of the glide test/burnishing head 212 into proximity with the surface of the disc 106;

4) the MPU then switches the direction control signal (264 in FIG. 11) to cause the glide test/burnishing head 212 to rotate back and forth across the area of the detected defect, in an attempt to burnish and mechanically remove the defect;

f) the glide test steps a–c are then repeated to determine if the burnishing process successfully removed the detected defect, with successful completion of the glide test resulting in the disc being passed to the disc drive manufacturing line, and additional detected defects causing the steps of e)1) through e)4) being repeated to attempt to burnish the defect and bring the disc into proper condition for use on the disc drive manufacturing line.

Comparison of the block diagrams of FIGS. 2 and 12 reveals that the system of FIG. 12, which utilizes the combination glide test/burnishing head 212 of the present invention, eliminates the requirement of a separate actuator and burnishing head, as well and the additional control logic necessary to drive the separate actuator, and thus results in a lower cost. test/burnishing system. Furthermore, since the same combination glide test/burnishing head and actuator are used for both the glide testing and burnishing operations, there is less time involved in accomplishing the complete glide testing/burnishing operation, leading to increased throughput in the manufacturing line.

The combination glide test/burnishing head, and the system which utilizes it, thus provide a significant reduction in capital equipment costs, and in the manufacture of disc drives, while still providing discs of reliable quality to the disc drive manufacturing process.

From the foregoing, it is apparent that the present invention is particularly well suited and well adapted to achieve the objects set forth hereinabove, as well as possessing other advantages inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A combination glide test/burnishing head assembly, for detecting the presence of glide test defects on a disc being tested and for burnishing locations of such detected glide test defects, comprising:

a slider body having longitudinal and lateral axes which are mutually perpendicular and substantially parallel to a surface of the disc being tested;

a pitch axis substantially parallel with the lateral axis;

a roll axis substantially parallel with the longitudinal axis and a direction of relative motion between the combination glide test/burnishing head assembly and the disc being tested;

a yaw axis substantially perpendicular to both the pitch and roll axes;

an arrangement of air bearing surfaces on a first, lower surface of the slider body, the air bearing surfaces extending substantially longitudinally along lateral edges of the slider body and forming a recessed surface therebetween, and;

a burnishing pad projecting from the recessed surface, and;

two piezoelectric sensor/microactuator elements, mounted at laterally disposed locations on a second, upper surface of the slider body opposite the first lower surface, and near a trailing edge of the slider body, the piezoelectric sensor/microactuator elements capable of operating in a passive mode as piezoelectric sensors for generating a defect detection signal indicative of contact between the air bearing surfaces and a glide test defect on the disc being tested, and, the piezoelectric sensor/microactuator elements capable of operating in an active mode, in cooperation with connecting elements of an associated head suspension, as piezoelectric microactuators for controllably rotating the slider body about an axis substantially parallel with the yaw axis of the slider body to move the burnishing pad laterally back and forth.

2. A combination glide test/burnishing head assembly comprising:

a slider body including a yaw axis, and;

means, operable in a passive mode for detecting glide test defects and generating a defect detection signal in response thereto, and operable in an active mode for controllably moving the slider body in a rotary manner about an axis substantially parallel to the yaw axis.

3. A combination glide test/burnishing head assembly comprising:

a slider body including air bearing surfaces for hydrodynamic interaction with a recording surface of a disc being tested;

two piezoelectric sensor/microactuator elements mounted on the slider body, and;

a burnishing feature integral to the slider body, wherein the combination glide test/burnishing head assembly operates in a passive, sensor mode with the slider body flying at a first, glide test height above the recording surface of the disc being tested and with the piezoelectric sensor/microactuator elements serving as sensor elements capable of outputting a defect detection signal reflective of contact between the air bearing surfaces and defects on the recording surface of the disc being tested, and wherein the combination glide test/burnishing head assembly operates in an active, burnishing mode with the slider body flying at a second, burnishing height, less than the first, glide test height, above the recording surface of the disc being tested and with the piezoelectric sensor/microactuator elements serving as microactuators capable of being controllably driven to move the slider body and integral burnishing feature to facilitate burnishing of defects on the recording surface of the disc being tested.

\* \* \* \* \*